United States Patent
Xu et al.

(10) Patent No.: US 12,395,423 B2
(45) Date of Patent: Aug. 19, 2025

(54) FORWARDING METHOD FOR DETECTING A PRESET PACKET INDICATOR BY A BIT-FORWARDING INTERMEDIATE ROUTER

(71) Applicant: ZTE Corporation, Shenzhen (CN)

(72) Inventors: Benchong Xu, Shenzhen (CN); Zheng Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 119 days.

(21) Appl. No.: 18/568,934

(22) PCT Filed: May 30, 2022

(86) PCT No.: PCT/CN2022/095891
§ 371 (c)(1),
(2) Date: Dec. 11, 2023

(87) PCT Pub. No.: WO2022/257798
PCT Pub. Date: Dec. 15, 2022

(65) Prior Publication Data
US 2024/0291748 A1 Aug. 29, 2024

(30) Foreign Application Priority Data
Jun. 10, 2021 (CN) .......................... 202110647845.X

(51) Int. Cl.
*G06F 15/16* (2006.01)
*H04L 45/00* (2022.01)
(Continued)

(52) U.S. Cl.
CPC .............. *H04L 45/16* (2013.01); *H04L 45/17* (2022.05); *H04L 45/34* (2013.01); *H04L 45/507* (2013.01)

(58) Field of Classification Search
CPC ......... H04L 45/16; H04L 45/17; H04L 45/34; H04L 45/507; H04L 45/50; H04L 45/00;
(Continued)

(56) References Cited

U.S. PATENT DOCUMENTS 9,350,654 B1 * 5/2016 Gredler ................. H04L 45/507
2016/0134518 A1 * 5/2016 Callon .................... H04L 45/24
370/390
(Continued)

FOREIGN PATENT DOCUMENTS

| CN | 106656794 A | 5/2017 |
| CN | 109246017 A | 1/2019 |

(Continued)

OTHER PUBLICATIONS

European Search Report for corresponding application EP22819396; Report dated Oct. 2, 2024.
R.N.Pise, "Packet Forwarding with Multiprotocol Label Switching with Multiprotocol Label Switching", Proceedings of World Academy of Science, Engineering and Technology, vol. 7, Aug. 7, 2005.
(Continued)

*Primary Examiner* — Razu A Miah
(74) *Attorney, Agent, or Firm* — CANTOR COLBURN LLP

(57) ABSTRACT

Embodiments of the present disclosure relate to the technical field of communications, and in particular, to a forwarding method, a forwarding system, an electronic device, and a computer-readable storage medium. The forwarding method includes: acquiring a packet to be forwarded, and detecting whether the packet to be forwarded contains a preset indicator, wherein the preset indicator is used for indicating that the packet to be forwarded has a designated forwarding path; when the packet to be forwarded contains the preset indicator, acquiring information of a protocol header following a Bit Indexed Explicit Replication (BIER) header of the
(Continued)

packet to be forwarded, wherein the information of the protocol header is at least used for indicating the designated forwarding path; determining a next hop according to the information of the protocol header; and forwarding the packet to be forwarded according to the next hop.

11 Claims, 7 Drawing Sheets

(51) Int. Cl.
*H04L 45/16* (2022.01)
*H04L 45/17* (2022.01)
*H04L 45/50* (2022.01)

(58) Field of Classification Search
CPC ..... H04L 69/325; H04L 45/74; H04L 45/745; H04L 69/22
See application file for complete search history.

(56) References Cited

U.S. PATENT DOCUMENTS

| | | | |
|---|---|---|---|
| 2018/0241671 A1* | 8/2018 | Bosch | H04L 69/22 |
| 2019/0140947 A1* | 5/2019 | Zhuang | H04L 45/306 |
| 2021/0044514 A1 | 2/2021 | Xie et al. | |
| 2021/0409333 A1* | 12/2021 | Barritt | H04L 47/17 |

FOREIGN PATENT DOCUMENTS

| | | |
|---|---|---|
| CN | 112187648 A | 1/2021 |
| WO | 2018184487 A1 | 10/2018 |
| WO | 2021073357 A1 | 4/2021 |

OTHER PUBLICATIONS

International Search Report for corresponding application PCT/CN2022/095891 filed May 30, 2022; Mail date Jul. 28, 2022.

* cited by examiner

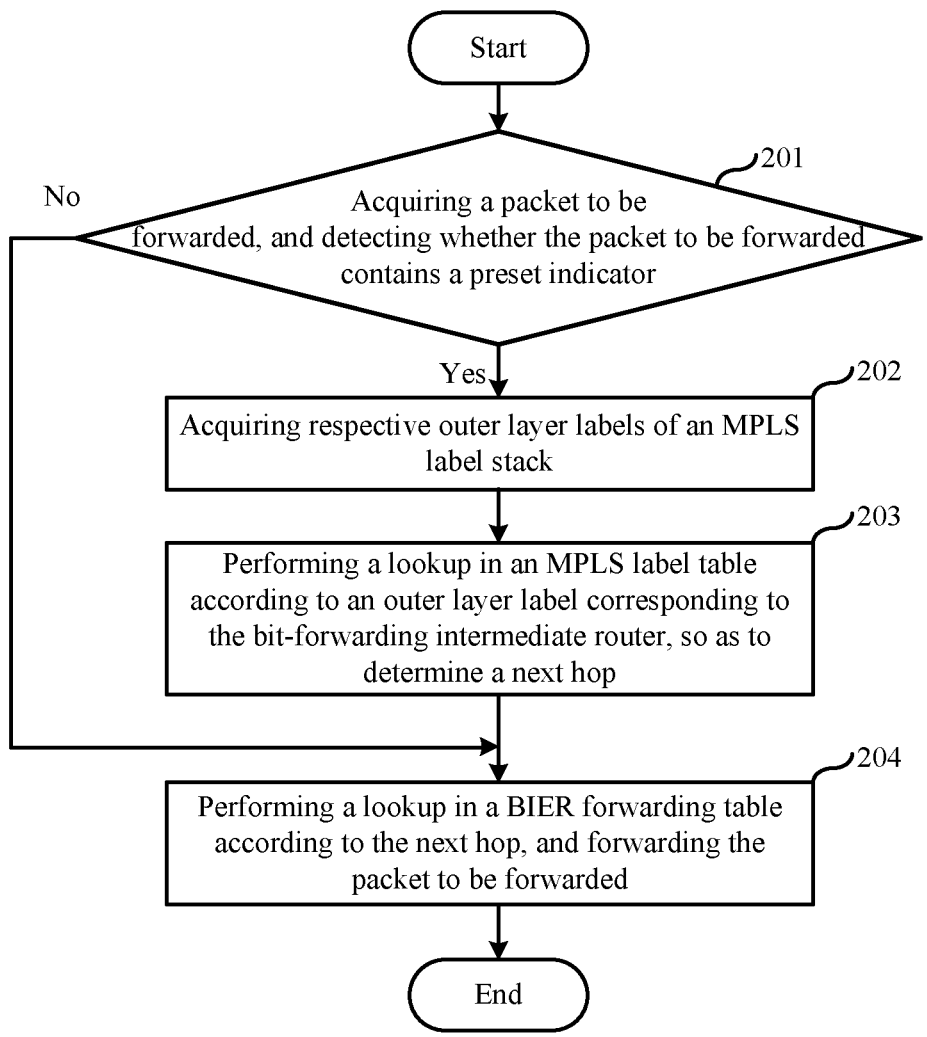

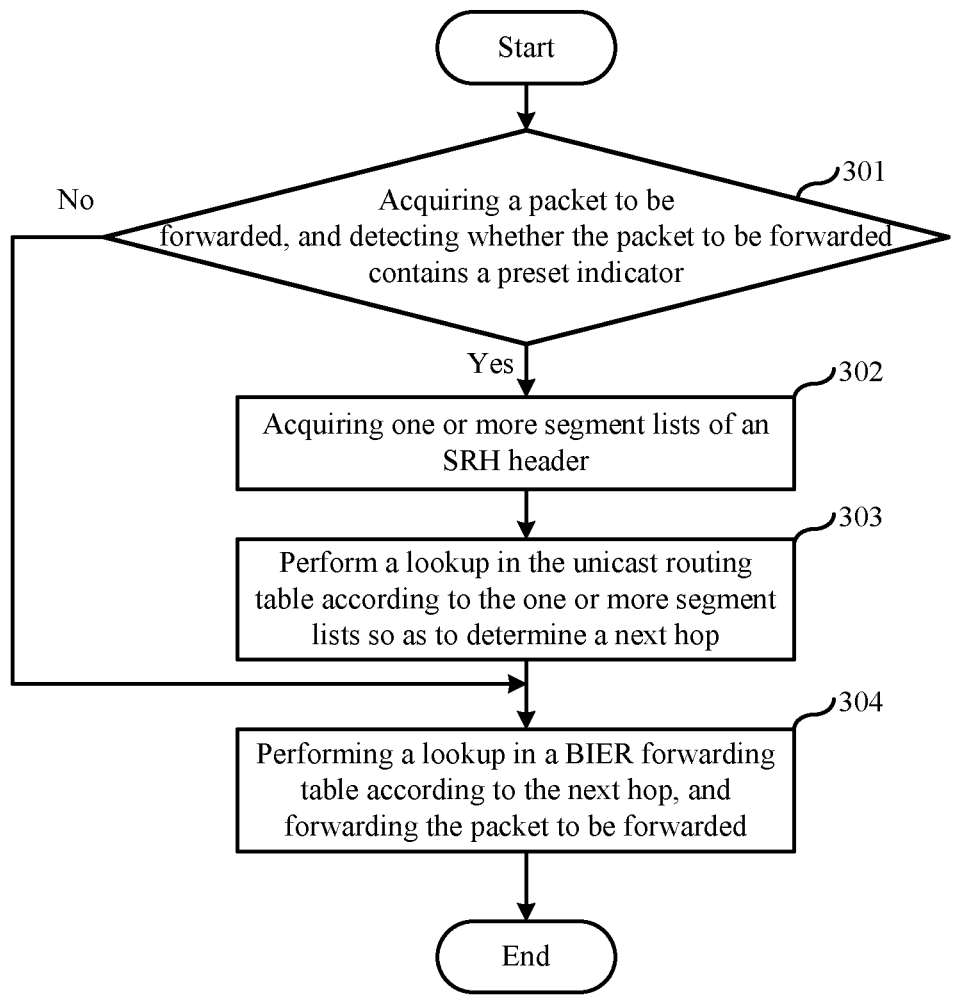

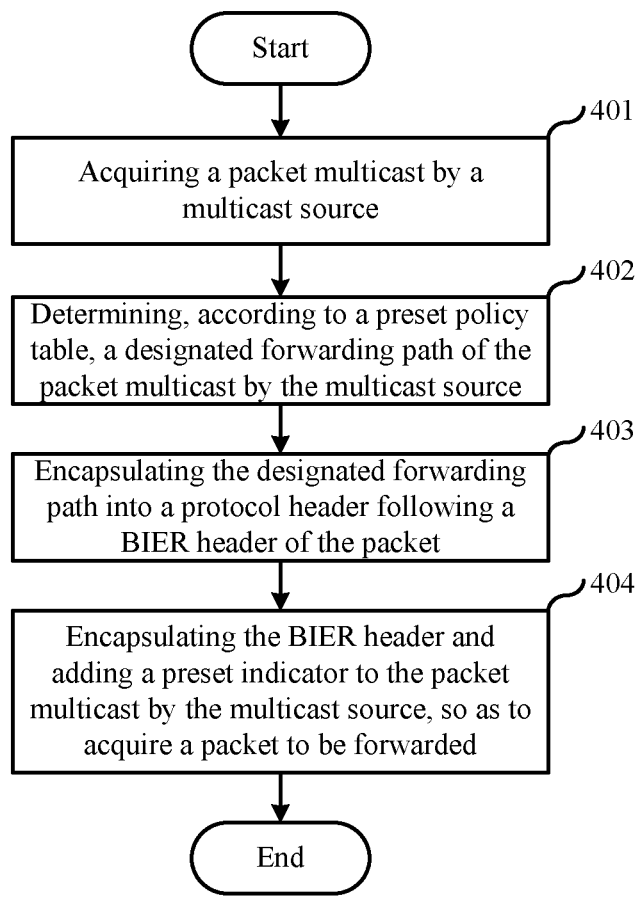

Fig. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Header   | Hdr Ext Len   | Routing Type  | Segments Left |
+-+-+-+-+-+-+-+-+-+-+-+-+-+-+-+-+-+-+-+-+-+-+-+-+-+-+-+-+-+-+-+-+
| Last Entry    |     Flags     |              Tag              |
+-+-+-+-+-+-+-+-+-+-+-+-+-+-+-+-+-+-+-+-+-+-+-+-+-+-+-+-+-+-+-+-+
|                                                               |
|            Segment List[0] (128 bits IPv6 address)            |
|                                                               |
+-+-+-+-+-+-+-+-+-+-+-+-+-+-+-+-+-+-+-+-+-+-+-+-+-+-+-+-+-+-+-+-+
|                                                               |
|                             ...                               |
|                                                               |
+-+-+-+-+-+-+-+-+-+-+-+-+-+-+-+-+-+-+-+-+-+-+-+-+-+-+-+-+-+-+-+-+
|                                                               |
|            Segment List[n] (128 bits IPv6 address)            |
|                                                               |
+-+-+-+-+-+-+-+-+-+-+-+-+-+-+-+-+-+-+-+-+-+-+-+-+-+-+-+-+-+-+-+-+
//                                                             //
//         Optional Type Length Value objects (variable)       //
//                                                             //
+-+-+-+-+-+-+-+-+-+-+-+-+-+-+-+-+-+-+-+-+-+-+-+-+-+-+-+-+-+-+-+-+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       BIFT-id         | TC  |S|       TTL     |
+-+-+-+-+-+-+-+-+-+-+-+-+-+-+-+-+-+-+-+-+-+-+-+-+-+-+-+-+-+-+-+-+
|Nibble | Ver   | BSL   |            Entropy                    |
+-+-+-+-+-+-+-+-+-+-+-+-+-+-+-+-+-+-+-+-+-+-+-+-+-+-+-+-+-+-+-+-+
|OAM|H|R|    DSCP       |     Proto     |        BFIR-id        |
+-+-+-+-+-+-+-+-+-+-+-+-+-+-+-+-+-+-+-+-+-+-+-+-+-+-+-+-+-+-+-+-+
|                   BitString (first 32 bits)                 ~
+-+-+-+-+-+-+-+-+-+-+-+-+-+-+-+-+-+-+-+-+-+-+-+-+-+-+-+-+-+-+-+-+
~                                                              ~
+-+-+-+-+-+-+-+-+-+-+-+-+-+-+-+-+-+-+-+-+-+-+-+-+-+-+-+-+-+-+-+-+
~                   BitString (last 32 bits)                   |
+-+-+-+-+-+-+-+-+-+-+-+-+-+-+-+-+-+-+-+-+-+-+-+-+-+-+-+-+-+-+-+-+
```

FORWARDING METHOD FOR DETECTING A PRESET PACKET INDICATOR BY A BIT-FORWARDING INTERMEDIATE ROUTER

CROSS-REFERENCE TO RELATED APPLICATION

This application is a National Stage Filing of the PCT International Application No. PCT/CN2022/095891 filed on May 30, 2022, which is based upon and claims priority to Chinese Patent Application No. 202110647845. X, filed on Jun. 10, 2021, the entire contents of which are incorporated herein by reference.

TECHNICAL FIELD

Embodiments of the present disclosure relate to the field of communications technologies, and in particular, to a forwarding method, a forwarding system, an electronic device, and a computer-readable storage medium.

BACKGROUND

With the rapid development of communication technologies, a traditional Internet Protocol (IP) multicast forwarding technology is no longer an optimal solution for the multicast forwarding technology, and a Bit Indexed Explicit Replication (BIER) technology gradually starts to develop. A BIER is a new multicast technology which is different from a traditional multicast tree technology. In the BIER technology, a set of destination nodes of a multicast packet is encapsulated in a packet header in the form of a bit string, and then the multicast packet is sent, so that the intermediate forwarding nodes in a network do not need to establish a multicast tree for each multicast stream and store the state of the multicast stream, and only needs to perform replication forwarding according to the set of destination nodes contained in the packet header.

However, the BIER technology lacks the capability of forwarding according to a designated forwarding path. Even if a Traffic Engineering for Bit Indexed Explicit Replication (BIER-TE) technology is used, only a part of nodes can be designated to a certain extent, and some bits cannot be erased, so that there may be a situation that these bits are carried in multiple packets in a network, which fundamentally destroys the mechanism of the BIER technology that prevents duplicate packets from existing in the network.

SUMMARY

The embodiments of the present disclosure provide a forwarding method, which is applied to a bit-forwarding intermediate router. The method includes: acquiring a packet to be forwarded, and detecting whether the packet to be forwarded contains a preset indicator, wherein the preset indicator is used for indicating that the packet to be forwarded has a designated forwarding path; when the packet to be forwarded contains the preset indicator, acquiring information of a protocol header following a Bit Indexed Explicit Replication (BIER) header of the packet to be forwarded, wherein the information of the protocol header is at least used for indicating the designated forwarding path; determining a next hop according to the information of the protocol header; and performing a lookup in a BIER forwarding table according to the next hop, and forwarding the packet to be forwarded.

An embodiment of the present disclosure also provides a forwarding method, which is applied to a Bit-Forwarding Ingress Router (BFIR). The method includes: acquiring a packet multicast by a multicast source; determining, according to a preset policy table, a designated forwarding path of the packet multicast by the multicast source; encapsulating the designated forwarding path in a protocol header following a Bit Indexed Explicit Replication (BIER) header of the packet; and encapsulating the BIER header and adding a preset indicator to the packet multicast by the multicast source, so as to acquire a packet to be forwarded.

An embodiment of the present disclosure also provides a forwarding method, which is applied to a Bit-Forwarding Egress Router (BFER). The method includes: acquiring a packet to be forwarded; parsing the packet to be forwarded to acquire information of a protocol header following a Bit Indexed Explicit Replication (BIER) header of the packet to be forwarded, wherein the information of the protocol header is at least used for indicating a designated forwarding path of the packet to be forwarded; and sending the packet to be forwarded to a receiver according to the information of the protocol header.

An embodiment of the present disclosure also provides a forwarding system, including: a Bit-Forwarding Ingress Router (BFIR), a bit-forwarding intermediate router, and a Bit-Forwarding Egress Router (BFER).

An embodiment of the present disclosure also provides an electronic device, including: at least one processor; and a memory in communication connection with the at least one processor, wherein the memory stores an instruction that is able to be executed by the at least one processor, and the instruction, when being executed by the at least one processor, causes the at least one processor to execute the forwarding method applied to the bit-forwarding intermediate router, or execute the forwarding method applied to the bit-forwarding ingress router, or execute the forwarding method applied to the bit-forwarding egress router.

An embodiment of the present disclosure also provides a computer-readable storage medium, storing a computer program, wherein the computer program, when being executed by a processor, causes the processor to execute the forwarding method applied to the bit-forwarding intermediate router, or execute the forwarding method applied to the bit-forwarding ingress router, or execute the forwarding method applied to the bit-forwarding egress router.

BRIEF DESCRIPTION OF THE DRAWINGS

FIG. 3 is a second flowchart of a forwarding method according to another embodiment of the present disclosure;

FIG. 4 is a third flowchart of a forwarding method according to another embodiment of the present disclosure;

FIG. 5 is a fourth flowchart of a forwarding method according to another embodiment of the present disclosure;

FIG. 6 is a schematic structural diagram of a Segment Routing Header (SRH) according to another embodiment of the present disclosure;

FIG. 7 is a schematic structural diagram of a BIER header according to another embodiment of the present disclosure;

DETAILED DESCRIPTION

The embodiments of the present disclosure propose a forwarding method, a forwarding system, an electronic device, and a computer-readable storage medium, which may provide for a BIER technology a capability of forwarding a packet along a designated forwarding path, and at the same time, prevent the mechanism of the BIER technology from being destroyed.

To make the objectives, technical solutions, and advantages of the embodiments of the present disclosure clearer, the following describes each embodiment of the present disclosure in detail with reference to the accompanying drawings. A person having ordinary skill in the art may understand that many technical details are put forward in the embodiments of the present disclosure to help a reader understand the embodiments of the present disclosure better, however, the claimed technical solutions of the present disclosure may be implemented even without these technical details and various changes and modifications based on the following embodiments. The division of the following embodiments is for convenience of description, and shall not constitute any limitation to exemplary implementations of the present disclosure. The embodiments may be referred to and/or combined with each other without any contradiction.

An embodiment of the present disclosure relates to a forwarding method, which is applied to a bit-forwarding intermediate router. The implementation details of the forwarding method in this embodiment are described in detail as follows. The following content is only for ease of understanding and is not essential for implementing this solution.

Figure 1:
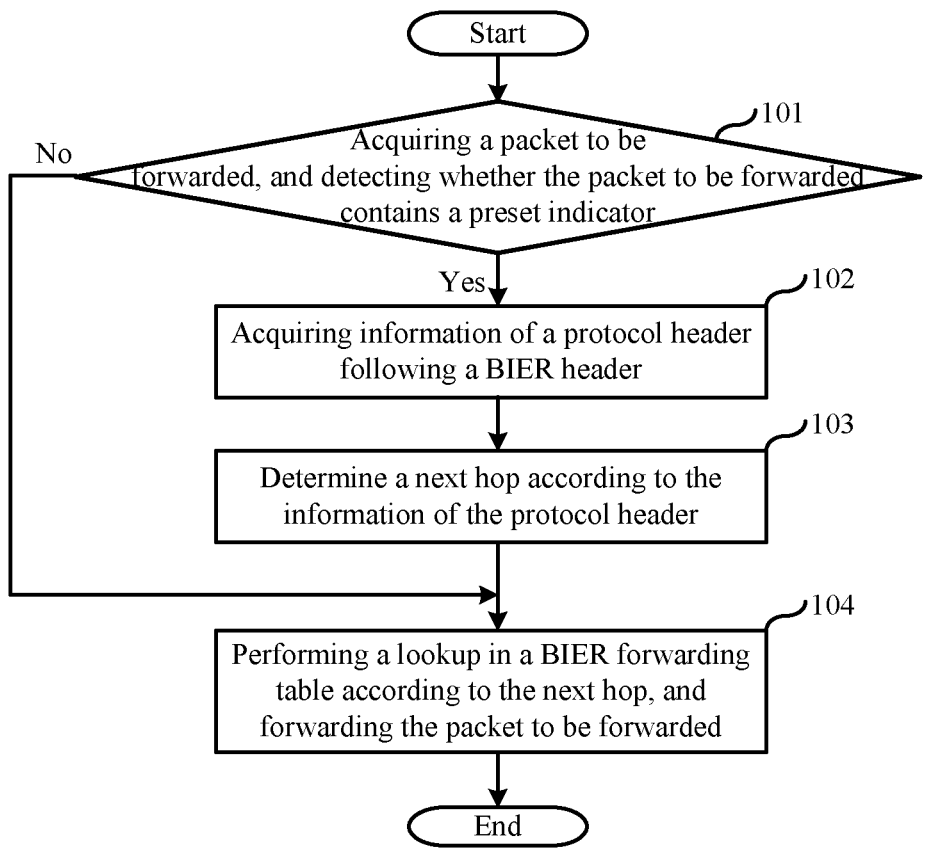
FIG. 1 is a first flowchart of a forwarding method according to an embodiment of the present disclosure.

A specific procedure of the forwarding method in this embodiment may be as shown in FIG. 1, including the following operations 101 to 104.

At operation 101, a packet to be forwarded is acquired, and whether the packet to be forwarded contains a preset indicator is detected; when the packet to be forwarded contains the preset indicator, operation 102 is executed; otherwise, operation 104 is executed.

For example, the bit-forwarding intermediate router may acquire the packet to be forwarded in real time, parse the acquired packet to be forwarded after acquiring the packet to be forwarded, and detect whether the packet to be forwarded contains the preset indicator. The preset indicator is used for indicating that the packet to be forwarded has a designated forwarding path, and the preset indicator may be set by a person having ordinary skill in the art according to actual requirements.

In an example, the preset indicator may be encapsulated in a BIER header of the packet to be forwarded; and after acquiring the packet to be forwarded, the bit-forwarding intermediate router may parse the acquired packet to be forwarded and detect whether the BIER header of the packet to be forwarded contains the preset indicator.

In an example, the preset indicator may be encapsulated in an outer packet header of a BIER header of the packet to be forwarded; and after acquiring the packet to be forwarded, the bit-forwarding intermediate router may parse the acquired packet to be forwarded and detect whether the outer packet header of the BIER header of the packet to be forwarded contains the preset indicator.

In an example, the bit-forwarding intermediate router may receive the packet to be forwarded which is sent by a Bit-Forwarding Ingress Router (BFIR), or receive the packet to be forwarded which is sent by a previous bit-forwarding intermediate router.

In an exemplary implementation, when detecting that the packet to be forwarded contains the preset indicator, the bit-forwarding intermediate router determines that the packet to be forwarded has a designated forwarding path; and when detecting that the packet to be forwarded does not contain the preset indicator, the bit-forwarding intermediate router determines that the packet to be forwarded has no designated forwarding path. Whether the packet to be forwarded has a designated forwarding path is judged by detecting whether the packet to be forwarded contains the preset indicator. The method is very accurate, quick and convenient, and ensures that the packet which needs to be forwarded along a designated forwarding path can be forwarded to a receiver according to the designated forwarding path, thereby improving the quality and efficiency of packet forwarding. A packet having no designated forwarding path is normally sent, thereby preventing network congestion.

Figure 2:
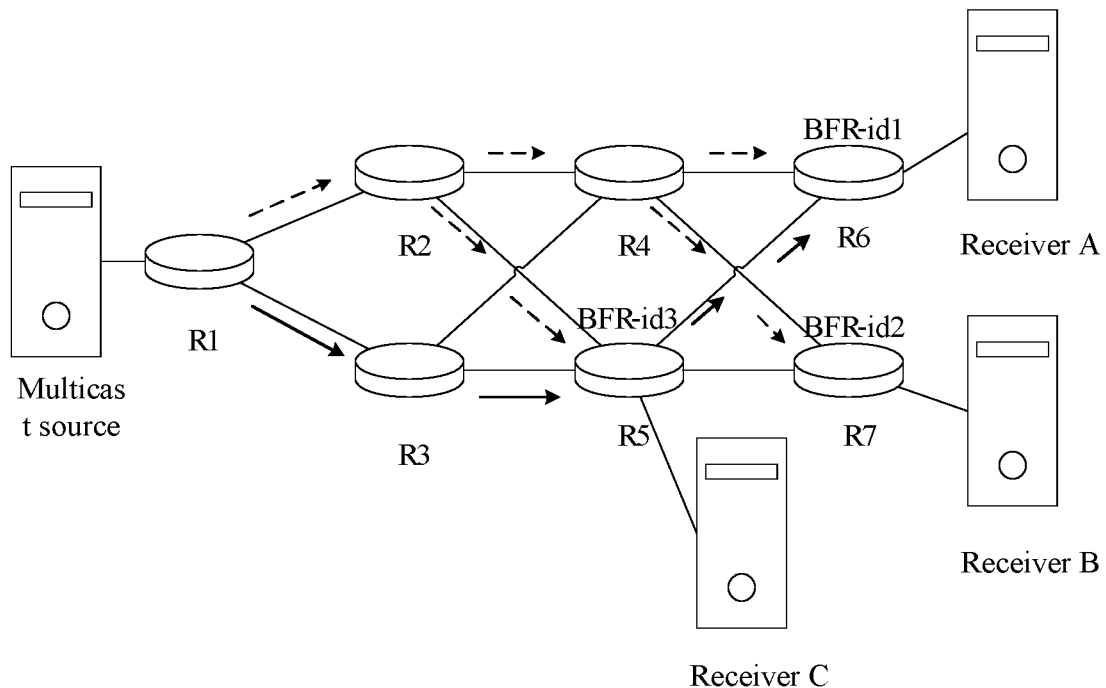
FIG. 2 is a schematic structural diagram of a multicast network according to an embodiment of the present disclosure.

In an example, the preset indicator is an H flag, and the H flag is encapsulated in a BIER header of the packet to be forwarded. The bit-forwarding intermediate router parses the BIER header of the packet to be forwarded, wherein the BIER header of the packet to be forwarded may be as shown in FIG. 2. When detecting the H flag in the BIER header, the bit-forwarding intermediate router determines that the packet to be forwarded has a designated forwarding path.

At operation 102, information of a protocol header following a BIER header is acquired.

For example, when determining that the packet to be forwarded contains the preset indicator, the bit-forwarding intermediate router may acquire the information of the protocol header following the BIER header of the packet to be forwarded. The information of the protocol header is at least used for indicating the designated forwarding path.

In an exemplary implementation, the bit-forwarding intermediate router may find, according to a Bit String Length (BSL) of the BIER header and a network data exchange rule (Protocol), the protocol header following the BIER header in the packet to be forwarded, and acquire the information of the protocol header following the BIER header.

At operation 103, a next hop is determined according to the information of the protocol header.

For example, after acquiring the information of the protocol header at least used for indicating the designated forwarding path, the bit-forwarding intermediate router may determine the next hop according to the information of the protocol header. According to the embodiment of the present disclosure, the next hop of the packet to be forwarded is determined based on the acquired information of the protocol header following the BIER header, so as to realize forwarding of the packet along the designated forwarding path, thereby providing for the BIER technology a capability of forwarding a packet along a designated forwarding path, and at the same time, preventing the mechanism of the BIER technology from being destroyed.

In an example, after acquiring the information of the protocol header at least used for indicating the designated forwarding path, the bit-forwarding intermediate router may perform a lookup in a Bit Index Forwarding Table (BIFT) according to the information of the protocol header to determine the next hop.

In an example, as shown in FIG. 2, the current bit-forwarding intermediate router is R3. After acquiring the information of the protocol header following the BIER header of the packet to be forwarded, R3 determines that the designated forwarding path of the packet to be forwarded is R1→R3→R5, so that R3 determines that the next hop is R5.

In an example, after determining the next hop, the bit-forwarding intermediate router may also acquire information corresponding to the next hop, where the information corresponding to the next hop includes, but is not limited to: a BIER encapsulation type of the next hop, a BIFT-id corresponding to the next hop, a BSL, and a mask (e.g., Forwarding Bit Mask (F-BM)).

At operation 104, a lookup is performed in a BIER forwarding table according to the next hop, and the packet to be forwarded is forwarded.

In an exemplary implementation, after determining the next hop, the bit-forwarding intermediate router may perform a lookup in the BIER forwarding table to acquire an IP address and a physical address of the next hop, and forward the packet to be forwarded to an entity corresponding to the next hop.

In an example, the bit-forwarding intermediate router may forward the packet to be forwarded to a bit-forwarding intermediate router corresponding to the next hop. For example, as shown in FIG. 2, the bit-forwarding intermediate router is R3, R3 determines that the next hop is R5, and R3 may send the packet to be forwarded to R5.

In another example, the bit-forwarding intermediate router may forward the packet to be forwarded to a Bit-Forwarding Egress Router (BFER) corresponding to the next hop. For example, as shown in FIG. 2, the bit-forwarding intermediate router is R5, R7 is a BFER, R5 determines that the next hop is R7, and R5 may send the packet to be forwarded to R7.

In this embodiment, the packet to be forwarded is acquired, and it is detected whether the packet to be forwarded contains the preset indicator, wherein the preset indicator is used for indicating that the packet to be forwarded has a designated forwarding path, and whether the packet to be forwarded has a designated forwarding path is judged by detecting whether the packet to be forwarded contains the preset indicator. The method is very accurate, quick and convenient, and ensures that the packet which needs to be forwarded along a designated forwarding path can be forwarded to a receiver according to the designated forwarding path, thereby improving the quality and efficiency of packet forwarding. A packet having no designated forwarding path is normally sent, thereby preventing network congestion. If a BIER header of the packet to be forwarded contains the preset indicator, information of a protocol header following the BIER header is acquired, wherein the information of the protocol header is at least used for indicating the designated forwarding path. The next hop is determined according to the information of the protocol header; and a lookup is performed in the BIER forwarding table according to the next hop, and the packet to be forwarded is forwarded. Considering that the BIER technology lacks the capability of forwarding according to a designated forwarding path, for example, the BIER-TE technology can only designate a part of nodes, and cannot arbitrarily designate a forwarding path of a packet according to requirements, and at the same time, some bits in the packet cannot be erased, thereby destroying the mechanism of the BIER technology that prevents duplicate packets from existing in a network. According to the embodiments of the present disclosure, the next hop of the packet to be forwarded is determined based on acquired information of the protocol header following the BIER header, so as to realize forwarding of the packet along the designated forwarding path, thereby providing for the BIER technology a capability of forwarding a packet along a designated forwarding path, and at the same time, maintaining the advantages of the forwarding mechanism of the BIER technology.

Another embodiment of the present disclosure relates to a forwarding method, which is applied to a bit-forwarding intermediate router. In the forwarding method in this embodiment, the protocol header following the BIER header being a Multi-Protocol Label Switching (MPLS) protocol stack is taken as an example for detailed description. The following content is only an implementation detail provided for easy understanding, not necessarily required to implement this solution. FIG. 3 is a flowchart of the forwarding method according to this embodiment, and the method includes the following operations 201 to 204.

At operation 201, a packet to be forwarded is acquired, and whether the packet to be forwarded contains a preset indicator is detected; when the packet to be forwarded contains the preset indicator, operation 202 is executed; otherwise, operation 204 is executed.

The operation 201 is substantially the same as the operation 101, and is not further described herein.

At operation 202, respective outer layer labels of the MPLS label stack are acquired.

For example, after detecting that the packet to be forwarded contains the preset indicator, that is, the packet to be forwarded has a designated forwarding path, the bit-forwarding intermediate router may acquire respective outer layer labels of the MPLS label stack. A combination of respective outer layer labels is used for indicating the designated forwarding path. The protocol header following the BIER header may be an MPLS label stack, and a combination of respective outer layer labels in the MPLS label stack is used for indicating the designated forwarding path. This method is clearer and more intuitive, and facilitates the reading and parsing by the bit-forwarding intermediate router.

In an example, as shown in FIG. 2, the bit-forwarding intermediate router is R3, and after detecting that the packet to be forwarded has the preset indicator, R3 acquires respective outer layer labels of the MPLS label stack, which are "1000" and "2000".

In an example, after acquiring the outer layer labels of the MPLS label stack, the bit-forwarding intermediate router may judge whether the outer layer labels include the outer layer label corresponding to the bit-forwarding intermediate router. When the outer layer labels include the outer layer label corresponding to the bit-forwarding intermediate router, the designated forwarding path of the packet to be forwarded is correct and the packet continues to be forwarded according to the designated forwarding path. When the outer layer labels do not include the outer layer label corresponding to the bit-forwarding intermediate router, the designated forwarding path is erroneous or the forwarding is incorrect, and the bit-forwarding intermediate router forwards the packet to be forwarded according to a preset default forwarding path.

According to the embodiments of the present disclosure, in order to ensure that the packet to be forwarded is able to be transmitted to a receiver, when the bit-forwarding intermediate router discovers that there is no label corresponding to the bit-forwarding intermediate router in the respective outer layer labels, the bit-forwarding intermediate router forwards the packet to be forwarded according to a default forwarding path until the packet arrives at the receiver.

In an exemplary implementation, the MPLS label stack further includes an inner layer label (also referred to as a stack bottom label) indicating a Virtual Private Network (VPN) instance of the receiver.

At operation 203, a lookup is performed in an MPLS label table according to an outer layer label corresponding to the bit-forwarding intermediate router, so as to determine the next hop.

For example, after acquiring the respective outer layer labels in the MPLS label stack, the bit-forwarding intermediate router may firstly determine the outer layer label corresponding to the bit-forwarding intermediate router, and then perform a lookup in an MPLS label table so as to determine the next hop.

In an example, as shown in FIG. 2, the designated forwarding path is R1→R3→R5, and the MPLS label stack includes an outer layer label "1000" indicating R3 and an outer layer label "2000" indicating R5. When receiving the packet to be forwarded, R3 acquires "1000" and "2000", determines that "1000" is an outer layer label corresponding to R3 itself, performs a lookup in an MPLS label table according to the outer layer label "2000" of the next layer, and determines that "2000" indicates R5, so that R3 determines that an egress interface is R5 and determines R5 as the next hop.

In an example, after determining the next hop, the bit-forwarding intermediate router may delete the outer layer label corresponding to the bit-forwarding intermediate router in the MPLS label stack, so that a subsequent bit-forwarding router can directly read the outer layer label required by itself, which further saves reading time. In addition, deleting the outer layer label of the previous bit-forwarding router may also avoid forwarding errors and reverse forwarding to some extent.

For example, as shown in FIG. 2, the designated forwarding path is R1→R3→R5, and the MPLS label stack includes an outer layer label "1000" indicating R3 and an outer layer label "2000" indicating R5. After determining that the next hop is R5, R3 may delete the outer layer label "1000" indicating R3 in the MPLS label stack of the packet to be forwarded, so that only the outer layer label "2000" indicating R5 is retained in the MPLS label stack of the packet to be forwarded that is sent to R5.

In an example, the bit-forwarding intermediate router may judge whether there is a non-zero bit in the MPLS bit string. When there is a non-zero bit in the MPLS bit string, it represents that the designated forwarding path is not completed and the packet continues to be forwarded to the next hop; and when there is no non-zero bit in the MPLS bit string, it represents that the designated forwarding path is completed, and the forwarding is terminated.

At operation 204, a lookup is performed in a BIER forwarding table according to the next hop, and the packet to be forwarded is forwarded.

The operation 204 is substantially the same as the operation 104, and is not further described herein.

In this embodiment, the protocol header following the BIER header includes a Multi-Protocol Label Switching (MPLS) label stack. The operation of acquiring the information of the protocol header following the BIER header includes: acquiring respective outer layer labels of the MPLS label stack, wherein a combination of the respective outer layer labels is used for indicating the designated forwarding path. The operation of determining the next hop according to the information of the protocol header includes: performing a lookup in an MPLS label table according to an outer layer label corresponding to the bit-forwarding intermediate router, so as to determine the next hop.

In the embodiment of the present disclosure, the protocol header following the BIER header is an MPLS label stack, and a combination of the respective outer layer labels in the MPLS label stack is used for indicating the designated forwarding path. The method is clearer and more intuitive, and facilitates reading and parsing by a bit-forwarding router. The next hop of the bit-forwarding router is determined by performing a lookup in an MPLS label table according to the outer layer label, so that the visualization of the designated forwarding path is realized, and tracing by a user is facilitated.

Another embodiment of the present disclosure relates to a forwarding method, which is applied to a bit-forwarding intermediate router. In the forwarding method in this embodiment, the protocol header following the BIER header is a Segment Routing Header (SRH) header or an Internet Protocol version 6 (IPv6) header. The protocol header following the BIER header being an SRH header is taken as an example for detailed description. The following content is only implementation details provided for easy understanding, and is not essential for implementation of this solution. FIG. 4 is a flowchart of a forwarding method according to this embodiment, which includes the following operations 301 to 304.

At operation 301, a packet to be forwarded is acquired, and whether the packet to be forwarded contains a preset indicator is detected; when the packet to be forwarded contains the preset indicator, operation 302 is executed; otherwise, operation 304 is executed.

The operation 301 is substantially the same as the operation 101, and is not further described herein.

At operation 302, one or more segment lists of the SRH header are acquired.

For example, after detecting that the packet to be forwarded contains the preset indicator, that is, the packet to be forwarded has a designated forwarding path, the bit-forwarding intermediate router may acquire the segment list of the SRH header following the BIER header. The segment list of the SRH header is used for indicating the designated forwarding path. The protocol header following the BIER header may be an SRH header, and the segment list of the SRH header is used for indicating the designated forwarding path. The method is clearer and more intuitive, and facilitates reading and parsing by the bit-forwarding intermediate router.

In an example, after acquiring the segment list of the SRH header, the bit-forwarding intermediate router may judge whether the segment list records the IPv6 address of the bit-forwarding intermediate router. When the segment list of the SRH header records the IPv6 address of the bit-forwarding intermediate router, the designated forwarding path of the packet to be forwarded is correct, and the packet continues to be forwarded according to the designated forwarding path. When the segment list of the SRH header does not record the IPv6 address of the bit-forwarding intermediate router, the designated forwarding path is erroneous or the forwarding is incorrect, and the bit-forwarding intermediate router forwards the packet to be forwarded according to a preset default forwarding path.

In an example, after acquiring the SRH segment list, the bit-forwarding intermediate router determines that the SRH segment list only has the last Segment List, and the bit-forwarding intermediate router may delete the SRH header and delete the preset indicator in the BIER header.

At operation 303, a lookup is performed in a unicast routing table according to the one or more segment lists, so as to determine the next hop.

For example, after acquiring the segment list of the SRH header, the bit-forwarding intermediate router may perform a lookup in a unicast routing table according to the one or more segment lists, determine an egress interface of the bit-forwarding intermediate router, and determine the egress interface as the next hop.

In an example, as shown in FIG. 4, the designated forwarding path is R1→R3→R5, Segment list [1] in the segment list of the SRH header records an IPv6 address of R3, and Segment list [2] in the segment list of the SRH header records an IPv6 address of R5. When receiving the packet to be forwarded, R3 acquires Segment list [1] and Segment list [2], performs a lookup in a unicast routing table, determines that the bit-forwarding router of the egress interface of R3 is R5, and determines R5 as the next hop.

At operation 304, a lookup is performed in a BIER forwarding table according to the next hop, and the packet to be forwarded is forwarded.

The operation 304 is substantially the same as the operation 204, and is not further described herein.

It should be noted that the forwarding method when the protocol header following the BIER header is the IPv6 header is similar to the forwarding method in this embodiment, and is not further described herein.

In this embodiment, the protocol header following the BIER header includes an SRH header or an IPv6 header. The operation of acquiring the information of the protocol header following the BIER header of the packet to be forwarded includes: acquiring one or more segment lists of the SRH header or the IPv6 header; wherein the one or more segment lists are used for indicating the designated forwarding path; the operation of determining the next hop according to the information of the protocol header includes: performing a lookup in a unicast routing table according to the one or more segment lists to determine the next hop. The protocol header following the BIER header may be an SRH header or an IPv6 header. The one or more segment lists in the SDH header or the IPv6 header are used for indicating the designated forwarding path. The method is clearer and more intuitive, and facilitates reading and parsing by the bit-forwarding router.

Another embodiment of the present disclosure relates to a forwarding method, which is applied to a Bit-Forwarding Ingress Router (BFIR). The implementation details of the forwarding method in this embodiment are described as follows. The following content is only implementation details provided for easy understanding, and is not essential for implementing this solution. FIG. 5 is a flowchart of the forwarding method in this embodiment, including the following operations 401 to 404.

At operation 401, a packet multicast by a multicast source is acquired.

For example, the BFIR serves as ingress of a multicast network and directly communicates with the multicast source. The BFIR may receive a packet multicast and sent by the multicast source in real time.

In an example, as shown in FIG. 2, R1 directly communicates with a multicast source, where R1 is the ingress of the multicast network, that is, R1 is a BFIR.

At operation 402, a designated forwarding path of a packet multicast by the multicast source is determined according to a preset policy table.

For example, after receiving the packet multicast by the multicast source, the BFIR may determine, according to the preset policy table, the designated forwarding path of the packet multicast by the multicast source. The preset policy table may be set by a person having ordinary skill in the art before the multicast, which is not limited in the embodiment of the present disclosure.

In an example, a schematic diagram of a structure of a multicast network is as shown in FIG. 2, including a multicast source, three receivers and seven bit-forwarding routers, wherein R1 is a BFIR, R2, R3 and R4 are bit-forwarding intermediate routers, R6 and R7 are BFERs, and R5 serves as a bit-forwarding intermediate router and a BFER. A default forwarding path is to forward a packet in an ascending order of Bit-Forwarding Router Identity documents (BFR-id), that is, the packet to be forwarded is sent to the receiver A through R1, R2, R4, and R6; the packet to be forwarded is sent to the receiver B through R1, R2, R4 and R7; and the packet to be forwarded is sent to the receiver C through R1, R2 and R5. After receiving the packet multicast by the multicast source, the BFIR determines, according to the preset policy table, that the designated forwarding path of the packet is: R1→R3→R5 (including R1→R3→R5, R1→R3→R5-R6 and R1→R3→R5→R7).

At operation 403, the designated forwarding path is encapsulated into a protocol header following a BIER header of the packet.

For example, after determining the designated forwarding path of the packet multicast by the multicast source, the BFIR may encapsulate the designated forwarding path in the protocol header following the BIER header of the packet.

In an example, the protocol header following the BIER header of the packet may be an MPLS header, that is, an MPLS label stack. After receiving the packet multicast by the multicast source, the BFIR may determine the designated forwarding path of the packet according to the preset policy table, and encapsulate the designated forwarding path in the MPLS label stack in the form of one or more outer layer labels. For example, as shown in FIG. 2, the designated forwarding path is R1→R3→R5, since R1 is a BFIR, the packet to be forwarded of course passes through R1, and there is no need to encapsulate an outer layer label for R1. After acquiring the packet multicast by the multicast source, the BFIR encapsulates an outer layer label "1000" for R3 in the MPLS label stack, and encapsulates an outer layer label "2000" for R5 in the MPLS label stack.

In an example, the protocol header following the BIER header of the packet may be an SRH header. A schematic structural diagram of the SRH header may be shown in FIG. 6. After receiving the packet multicast by the multicast source, the BFIR may determine the designated forwarding path of the packet according to a preset policy table, add the designated forwarding path to one or more segment lists of the SRH header, and encapsulate the SRH header. For example, as shown in FIG. 2, the designated forwarding path is R1→R3→R5, and since R1 is a BFIR, the packet to be forwarded of course passes through R1, and there is no need to add an IPv6 address of R1 to the segment lists of the SRH header. After acquiring the packet multicast by the multicast source, the BFIR adds the IPv6 address of R3 in segment list [1] of the SRH header, and adds the IPv6 address of R5 in segment list [2] of the SRH header.

In another example, the protocol header following the BIER header of the packet may be an IPv6 header.

At operation 404, the BIER header is encapsulated and a preset indicator is added to the packet multicast by the multicast source, so as to acquire a packet to be forwarded.

In an exemplary implementation, after encapsulating the designated forwarding path in the protocol header following the BIER header of the packet, the BFIR may encapsulate the BIER header and add the preset indicator in the BIER header to acquire the packet to be forwarded. The designated forwarding path is encapsulated in the protocol header following the BIER header, and the preset indicator is added when the BIER header is encapsulated so as to represent that the packet to be forwarded has a designated forwarding path, which may ensure that a bit-forwarding router may quickly and accurately identify the designated forwarding path and forward the packet according to the designated forwarding path.

In an example, the preset indicator is an H flag. When encapsulating the BIER header of the packet, the BFIR may add an H flag in the BIER header, and the BIER header to which the H flag is added may be as shown in FIG. 7. The BFIR may add the preset indicator at any position of the BIER header, which is not limited in the embodiment of the present disclosure.

Figure 8:
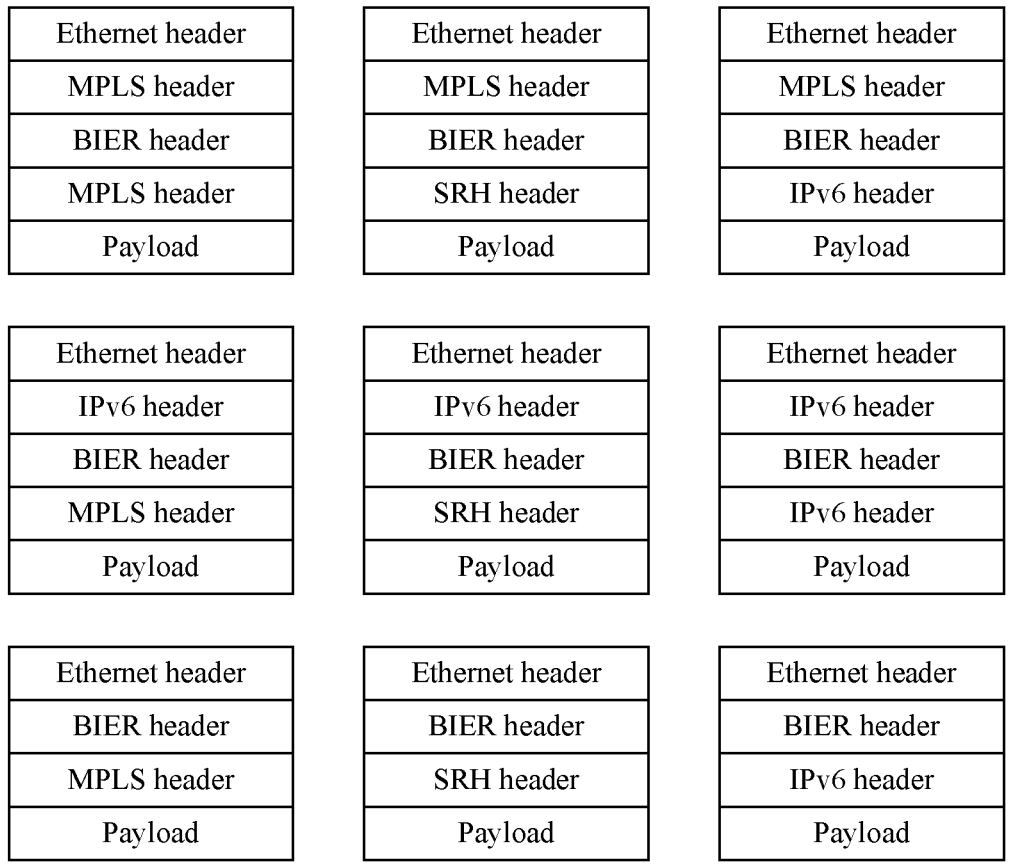
FIG. 8 is a schematic structural diagram of a packet to be forwarded according to another embodiment of the present disclosure.

In an exemplary implementation, the BIER header of the packet may be encapsulated at an inner layer of another protocol header, such as MPLS encapsulation and IPv6 encapsulation, and the BIER header may alternatively be encapsulated separately, such as Ethernet encapsulation. After encapsulating the BIER header and adding the preset indicator into the BIER header, the BFIR may acquire packet to be forwarded. FIG. 8 is a schematic structural diagram of several types of packets to be forwarded.

In this embodiment, the packet multicast by the multicast source is acquired; the designated forwarding path of the packet multicast by the multicast source is determined according to the preset policy table; the designated forwarding path is encapsulated in the protocol header following the BIER header of the packet; the BIER header is encapsulated and the preset indicator is added to the packet multicast by the multicast source, so as to acquire the packet to be forwarded. The BFIR encapsulates the designated forwarding path in the protocol header following the BIER header, and adds the preset indicator when the BIER header is encapsulated so as to indicate that the packet to be forwarded has the designated forwarding path, thereby ensuring that each bit-forwarding router may quickly and accurately identify the designated forwarding path and forward the packet according to the designated forwarding path.

Figure 9:
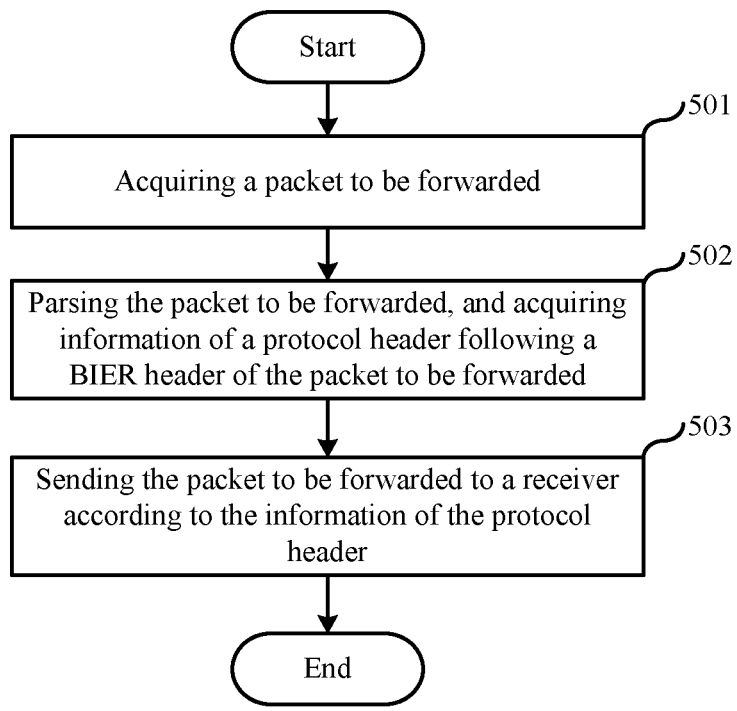
FIG. 9 is a fifth flowchart of a forwarding method according to another embodiment of the present disclosure.

Another embodiment of the present disclosure relates to a forwarding method, which is applied to a Bit-Forwarding Egress Router (BFER). The implementation details of the forwarding method in this embodiment are described as follows. The following content is only implementation details provided for easy understanding, and is not essential for implementing this solution. FIG. 9 is a flowchart of the forwarding method in this embodiment, and the method includes the following operations 501 to 503.

At operation 501, a packet to be forwarded is acquired.

For example, the BFER may acquire, in real time, the packet to be forwarded sent by the previous bit-forwarding intermediate router.

In an example, a bit-forwarding router may not only operate as a bit-forwarding intermediate router, but also operate as a BFER in a multicast network. For example, as shown in FIG. 2, R5 is not only a bit-forwarding intermediate router, but also a BFER which may directly communicate with the receiver C.

At operation 502, the packet to be forwarded is parsed to acquire information of a protocol header following a BIER header of the packet to be forwarded.

For example, the BFER may parse the packet to be forwarded to acquire the information of the protocol header following the BIER header of the packet to be forwarded. The information of the protocol header is at least used for indicating the designated forwarding path.

In an exemplary implementation, the BFER may find, according to a BSL of the BIER header and a network data exchange rule (Protocol), the protocol header following the BIER header in the packet to be forwarded, and acquire information of the protocol header following the BIER header.

In an example, the protocol header following the BIER header is an MPLS label stack, and after acquiring and parsing the packet to be forwarded, the BFER may judge whether an outer layer label exists in the MPLS label stack, where a combination of respective outer layer labels in the MPLS label stack is used for indicating the designated forwarding path. When there is an outer layer label in the MPLS label stack, the outer layer label is skipped, and a stack bottom label is directly acquired. The stack bottom label is used for indicating the receiver. In the embodiments of the present disclosure, the BFER does not read an outer layer label which is not useful to itself, thereby fundamentally eliminating the cases of repeated reading and invalid reading.

For example, as shown in FIG. 2, the designated forwarding path is: R1→R3→R5-R7, the labels in the MPLS label stack include "1000" representing R3, "2000" representing R5 and "3000" representing R7, where R5 is not only a bit-forwarding intermediate router, but also a BFER which is connected to the receiver C. When the packet to be forwarded arrives at R5, the packet has already passed through R3, and therefore the outer layer label "1000" has been deleted by R3, and the MPLS label stack of the packet to be forwarded received by R5 still has two labels "2000" and "3000". When R5 serves as the BFER, R5 may skip the outer layer labels "2000" and "3000", and directly acquire the stack bottom label.

At operation 503, the packet to be forwarded is sent to the receiver according to the information of the protocol header.

In an exemplary implementation, after acquiring the information of the protocol header following the BIER header, the BFER may acquire Virtual Private Network (VPN) instance information according to the information of the protocol header, where the VPN instance information includes, but is not limited to, an IP address of the receiver and a physical address of the receiver. After acquiring the VPN instance information, the BFER may send the packet to be forwarded to the receiver according to the VPN instance information.

In an example, the protocol header following the BIER header is an MPLS label stack, and the BFER may perform a lookup in a BIER Forwarding Table (BIFT) according to the stack bottom label to acquire the VPN instance information. For example, as shown in FIG. 2, the BFER is R5, and R5 performs a lookup in the BIFT according to the stack bottom label, acquires the IP address and the physical address of receiver C, and sends the packet to be forwarded to receiver C according to the IP address and the physical address of receiver C in the VPN instance information.

The operation division of the above various methods is only for the purpose of clear description, and during implementation, some operations may be combined into one operation or some operations may be divided into a plurality of operations, and all these solution are within the scope of protection of the present patent as long as they include the same logic relationship. The solutions that add insignificant modifications or introduce insignificant designs into the algorithms or flows without changing the core design of the algorithms and flows are within the scope of protection of the present disclosure.

Figure 10:
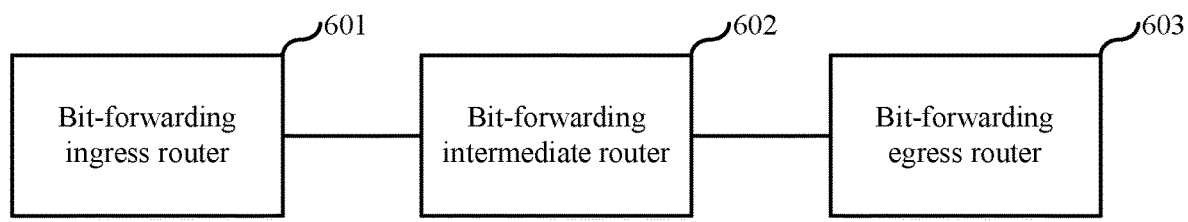
FIG. 10 is a schematic diagram of a forwarding system according to another embodiment of the present disclosure.

Another embodiment of the present disclosure relates to a forwarding system. The implementation details of the forwarding system of this embodiment are specifically described below. The following content is only for ease of understanding of the provided implementation details, and is not essential for implementing this solution. FIG. 10 is a schematic diagram of the forwarding system of this embodiment. The forwarding system includes:

a bit-forwarding ingress router 601, a bit-forwarding intermediate router 602 and a bit-forwarding egress router 603. The bit-forwarding ingress router 601 is connected to the bit-forwarding intermediate router 602, and the bit-forwarding intermediate router 602 is connected to the bit-forwarding egress router 603.

The bit-forwarding ingress router 601 is configured to acquire a packet multicast by a multicast source, acquire a packet to be forwarded according to the packet multicast by the multicast source, and send the packet to be forwarded to the bit-forwarding intermediate router 602 or the bit-forwarding egress router 603 according to a designated forwarding path.

The bit-forwarding intermediate router 602 is configured to acquire the packet to be forwarded, and send the packet to be forwarded to other bit-forwarding intermediate routers or the bit-forwarding egress router 603 according to the designated forwarding path.

The bit-forwarding egress router 603 is configured to acquire the packet to be forwarded, and send the packet to be forwarded to the receiver.

It may be easily found that this embodiment is a system embodiment corresponding to the foregoing embodiments, and this embodiment may be implemented in cooperation with the foregoing embodiments. Related technical details and technical effects mentioned in the foregoing embodiments are still effective in this embodiment, and are not described herein again to reduce repetition. Correspondingly, related technical details mentioned in this embodiment may also be applied in the foregoing embodiments.

Figure 11:
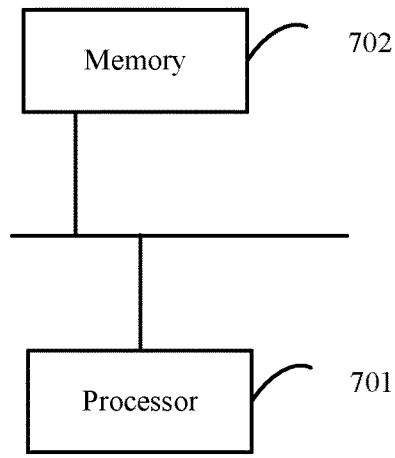
FIG. 11 is a schematic structural diagram of an electronic device according to another embodiment of the present disclosure.

Another embodiment of the present disclosure relates to an electronic device. As shown in FIG. 11, the electronic device includes: at least one processor 701 and a memory 702 in communication connection with the at least one processor 701. The memory 702 stores an instruction that is able to be executed by the at least one processor 701, where the instruction, when being executed by the at least one processor 701, causes the at least one processor 701 to execute the forwarding method applied to the bit-forwarding intermediate router, the forwarding method applied to the BFIR, or the forwarding method applied to the BFER in the foregoing embodiments.

The memory and the at least one processor are connected via a bus, the bus may include any number of interconnected buses and bridges, and the bus connects various circuits of the one or more processors and the memory together. The bus may also connect a variety of other circuits, such as peripheral devices, voltage regulators, and power management circuitry, which are well known in the art and therefore are not described further herein. The bus interface provides an interface between the bus and a transceiver. The transceiver may be one element or multiple elements, such as multiple receivers and transmitters which provide means for communicating with various other devices over a transmission medium. Data processed by the processor is transmitted on a wireless medium through an antenna, and the antenna also receives data and transmits the data to the processor.

The processor is responsible for managing a bus and general processing, and may further provide various functions, including timing, peripheral interfaces, voltage regulation, power management, and other control functions. And the memory may be used to store data used by the processor in performing operations.

Another embodiment of the present disclosure relates to a computer-readable storage medium, which stores a computer program. The computer program implements the foregoing method embodiments when being executed by a processor.

That is, a person having ordinary skill in the art may understand that all or a part of the operations of the methods in the foregoing embodiments may be implemented by relevant hardware instructed by a program. The program is stored in a storage medium and includes several instructions for instructing a device (which may be a single chip, a chip, or the like) or a processor to execute all or a part of the operations of the methods in the embodiments of the present disclosure. The foregoing storage medium includes any medium that can store program codes, such as a USB flash disk, a removable hard disk, a Read-Only Memory (ROM), a Random Access Memory (RAM), a magnetic disk, or an optical disk.

A person having ordinary skill in the art may understand that the foregoing embodiments are exemplary embodiments for implementing the present disclosure, and in practical applications, various changes may be made in form and details without departing from the principle and scope of the present disclosure.

What is claimed is:

1. A forwarding method, applied to a bit-forwarding intermediate router, the forwarding method comprising:
    acquiring a packet to be forwarded, and detecting whether the packet to be forwarded contains a preset indicator, wherein the preset indicator is used for indicating that the packet to be forwarded has a designated forwarding path;
    when the packet to be forwarded contains the preset indicator, acquiring information of a protocol header following a Bit Indexed Explicit Replication (BIER) header of the packet to be forwarded, wherein the preset indicator is encapsulated in the BIER header of the packet to be forwarded, or in an outer packet header of the BIER header of the packet to be forwarded; when the preset indicator is encapsulated in the BIER header of the packet to be forwarded, the preset indicator is an H flag; and the information of the protocol header is at least used for indicating the designated forwarding path;
    determining a next hop according to the information of the protocol header; and
    performing a lookup in a BIER forwarding table according to the next hop, and forwarding the packet to be forwarded.

2. The forwarding method according to claim 1, wherein the protocol header following the BIER header comprises a Multi-Protocol Label Switching (MPLS) label stack;
    acquiring the information of the protocol header following the BIER header comprises:
    acquiring respective outer layer labels of the MPLS label stack, wherein a combination of the respective outer layer labels is used for indicating the designated forwarding path.

3. The forwarding method according to claim 2, wherein determining the next hop according to the information of the protocol header comprises:
performing a lookup in an MPLS label table according to an outer layer label corresponding to the bit-forwarding intermediate router, so as to determine the next hop.

4. The forwarding method according to claim 3, wherein after determining the next hop, the method further comprises:
deleting the outer layer label corresponding to the bit-forwarding intermediate router in the MPLS label stack.

5. The forwarding method according to claim 2, wherein after acquiring the respective outer layer labels of the MPLS label stack and before determining the next hop according to the information of the protocol header, the method further comprises:
judging whether the respective outer layer labels comprise an outer layer label corresponding to the bit-forwarding intermediate router;
when the respective outer layer labels comprise the outer layer label corresponding to the bit-forwarding intermediate router, determining the next hop according to the information of the protocol header;
when the respective outer layer labels do not comprise the outer layer label corresponding to the bit-forwarding intermediate router, forwarding the packet to be forwarded according to a preset default forwarding path.

6. The forwarding method according to claim 1, wherein the protocol header following the BIER header comprises a Segment Routing Header (SRH) header or an Internet Protocol version 6 (IPv6) header;
acquiring the information of the protocol header following the BIER header of the packet to be forwarded comprises:
acquiring one or more segment lists of the SRH header or the IPv6 header, wherein the one or more segment lists are used for indicating the designated forwarding path.

7. The forwarding method according to claim 6, wherein determining the next hop according to the information of the protocol header comprises:
performing a lookup in a unicast routing table according to the one or more segment lists, so as to determine the next hop.

8. The forwarding method according to claim 1, wherein performing the lookup in the BIER forwarding table according to the next hop, and forwarding the packet to be forwarded comprises:
performing the lookup in the BIER forwarding table according to the next hop to acquire an IP address and a physical address of the next hop; and
forwarding the packet to be forwarded to an entity corresponding to the next hop according to the IP address and the physical address of the next hop.

9. A forwarding system, comprising: a Bit-Forwarding Ingress Router (BFIR), the bit-forwarding intermediate router which is configured to execute operations of the forwarding method according to claim 1, and a Bit-Forwarding Egress Router (BFER),
wherein the BFIR is configured to acquire a packet multicast by a multicast source; determine, according to a preset policy table, a designated forwarding path of the packet multicast by the multicast source; encapsulate the designated forwarding path in a protocol header following a Bit Indexed Explicit Replication (BIER) header of the packet; and encapsulate the BIER header and add a preset indicator to the packet multicast by the multicast source, so as to acquire a packet to be forwarded, wherein the preset indicator is encapsulated in the BIER header of the packet to be forwarded, or in an outer packet header of the BIER header of the packet to be forwarded; when the preset indicator is encapsulated in the BIER header of the packet to be forwarded, the preset indicator is an H flag;
the bit-forwarding intermediate router is configured to acquire the packet to be forwarded, and detect whether the packet to be forwarded contains the preset indicator, wherein the preset indicator is used for indicating that the packet to be forwarded has the designated forwarding path; when the packet to be forwarded contains the preset indicator, acquire the information of the protocol header following the BIER header of the packet to be forwarded; determine a next hop according to the information of the protocol header; and perform a lookup in a BIER forwarding table according to the next hop, and forward the packet to be forwarded; and
the BFER is configured to acquire the packet to be forwarded; parse the packet to be forwarded to acquire information of the protocol header following the BIER header of the packet to be forwarded, wherein the information of the protocol header is at least used for indicating the designated forwarding path of the packet to be forwarded; and send the packet to be forwarded to a receiver according to the information of the protocol header.

10. An electronic device applied to a bit-forwarding intermediate router, comprising:
at least one processor; and
a memory coupled with the at least one processor,
wherein the memory stores an instruction that is able to be executed by the at least one processor, and the instruction, when being executed by the at least one processor, causes the at least one processor to execute the forwarding method according to claim 1.

11. A non-transitory computer-readable storage medium, storing a computer program, wherein the computer program, when being executed by a processor of a bit-forwarding intermediate router, causes the processor to execute the forwarding method according to claim 1.

* * * * *